US006895309B2

(12) United States Patent
Ito

(10) Patent No.: US 6,895,309 B2
(45) Date of Patent: May 17, 2005

(54) CALENDAR TIMER MECHANISM AND PROCESSING APPARATUS

(75) Inventor: Tomohiko Ito, Odawara (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 69 days.

(21) Appl. No.: 10/396,468

(22) Filed: Mar. 26, 2003

(65) Prior Publication Data

US 2003/0202428 A1 Oct. 30, 2003

(30) Foreign Application Priority Data

Mar. 28, 2002 (JP) ....................................... 2002-092613

(51) Int. Cl.[7] ................................................ G05D 11/00

(52) U.S. Cl. ........................ 700/296; 700/295; 367/141; 399/70; 713/300

(58) Field of Search ................................ 700/295, 296; 703/321; 399/701; 367/141; 713/300

(56) References Cited

U.S. PATENT DOCUMENTS 5,721,936 A * 2/1998 Kikinis et al. .............. 700/296
6,166,355 A * 12/2000 Watanabe et al. ............. 399/70
6,191,563 B1 * 2/2001 Bangerter ................... 323/211
6,462,437 B1 * 10/2002 Marmaropoulos et al. .. 307/125
2003/0202428 A1 10/2003 Ito

FOREIGN PATENT DOCUMENTS

JP 6-337727 12/1994
JP 6-337727 A 12/1994
JP 9-34317 A 2/1997
JP 09-034317 2/1997
JP 10-39670 2/1998
JP 10-39670 A 2/1998
JP 11-146103 5/1999
JP 11-146103 A 5/1999
JP 2000-330648 11/2000
JP 2000-330648 A 11/2000
JP 2003-285505 A 10/2003

* cited by examiner

*Primary Examiner*—Albert W. Paladini
(74) *Attorney, Agent, or Firm*—Sughrue Mion, PLLC

(57) ABSTRACT

A calendar timer mechanism has an OFF mode for turning off all objects to be controlled, which include a heater, a display panel, and motors, an ON mode for turning on all the objects to be controlled, and at least two energy-saving modes for selectively turning off the objects to be controlled or turning on the objects to be controlled at a lower power consumption rate. Transitional times between at least three of the OFF mode, the ON mode, and the energy-saving modes can be set as desired.

13 Claims, 5 Drawing Sheets

| ENERGY-SAVING MODE | DISPLAY PANEL | MOTOR | HEATER |
|---|---|---|---|
| (1) | OFF | ON | ON (NORMAL) |
| (2) | OFF | OFF | ON (NORMAL) |
| (3) | OFF | OFF | ON (LOWERED TARGET TEMPERATURE) |
| (4) (OFF MODE) | OFF | OFF | OFF |
| (5) | OFF | ON | ON (LOWERED TARGET TEMPERATURE) |
| (6) | OFF | ON | OFF |

FIG. 3

| ENERGY-SAVING MODE | DISPLAY PANEL | MOTOR | HEATER |
|---|---|---|---|
| (1) | OFF | ON | ON (NORMAL) |
| (2) | OFF | OFF | ON (NORMAL) |
| (3) | OFF | OFF | ON (LOWERED TARGET TEMPERATURE) |
| (4) (OFF MODE) | OFF | OFF | OFF |
| (5) | OFF | ON | ON (LOWERED TARGET TEMPERATURE) |
| (6) | OFF | ON | OFF |

FIG. 4

| MODE | ENERGY-SAVING ABILITY | STARTUP TIME |
|---|---|---|
| ENERGY-SAVING MODE (1) | D | A |
| ENERGY-SAVING MODE (2) | C | B |
| ENERGY-SAVING MODE (3) | B | C |
| OFF MODE (ENERGY-SAVING MODE (4)) | A | D |

FIG. 5

| DAY | MORNING (9:00~) | LUNCH BREAK (12:00~1:00, 2:00) | NIGHT (17:00~) |
|---|---|---|---|
| MONDAY | OFF MODE→ON MODE | ON MODE→(1)→ON MODE | ON MODE→(3) |
| TUESDAY | (3)→ON MODE | ON MODE→(1)→ON MODE | ON MODE→OFF MODE |
| WEDNESDAY (CLOSED) | OFF MODE | OFF MODE | OFF MODE |
| THURSDAY | OFF MODE→ON MODE | ON MODE→(1)→ON MODE | ON MODE→(3) |
| FRIDAY | (3)→ON MODE | ON MODE→(2)→ON MODE | ON MODE→OFF MODE |
| SATURDAY (CLOSED) | OFF MODE | OFF MODE | OFF MODE |
| SUNDAY (CLOSED) | OFF MODE | OFF MODE | OFF MODE |

CALENDAR TIMER MECHANISM AND PROCESSING APPARATUS

BACKGROUND OF THE INVENTION

1. Field of the Invention

The present invention relates to a calendar timer mechanism for turning on and off an object to be controlled at preset times and allowing preset times to be changed as desired, and a processing apparatus incorporating such a calendar timer mechanism.

2. Description of the Related Art

In the art of forming images, there have been used image forming apparatus for forming images captured for ultrasonic diagnosis, CT diagnosis, MRI diagnosis, or X-ray diagnosis, as visible images on recording mediums, e.g., photosensitive thermal-development recording mediums.

Such an image forming apparatus usually has a drum with a heater such as a halogen lamp or the like housed therein and an endless belt trained around about two-thirds of the outer circumferential surface of the drum for movement in unison with the drum. When the drum is rotated about its own axis, a photosensitive thermal-development recording medium is gripped between the drum and the endless belt and fed thereby. While the photosensitive thermal-development recording medium is fed, it is heated at a predetermined temperature for a predetermined period of time to thermally develop a latent image recorded on the photosensitive thermal-development recording medium.

The image forming apparatus described above is generally installed in a hospital, and is operated during preset periods of time on each day of the week. There has been a demand for a system for automatically controlling operation of the image forming apparatus according to a preset schedule which is established to turn on and off the power supply of the image forming apparatus on each day of the week.

One known automatic operation control system is disclosed in Japanese laid-open patent publication No. 6-337727, for example. According to the disclosed automatic operation control system, times to turn on and off the power supply connected to an apparatus which is to be automatically controlled for operation are set in advance, and next times to turn on and off the power supply are selected from the set times and set in a calendar timer device. When each of the times set in the calendar timer device is reached, the calendar timer device generates a signal and applies the signal to turn on or off the apparatus.

The disclosed automatic operation control system requires no external action to turn on and off the power supply, and allows the power supply to be turned on and off a plurality of times according to a single schedule setting.

The above image forming apparatus takes about 20 to 30 minutes, for example, to heat up the heater in the drum when the heater is turned from a turned-off state. Even though the heater is turned on at a time set by the calendar timer device, since the heater needs to be heated up after the time when it is turned on, a considerable period of time is required until an image forming process is actually started.

In particular, once the heater is turned off at a break such as a lunchtime or the like in the hospital, it will take some time after the heater is turned on next time until a next image forming process is started, resulting in a need for an unwanted standby time after the break. To avoid the inconvenient time consumption, it has been customary to keep the heater energized even during the break. This practice goes against efforts to save energy and hence is uneconomical.

The above problem is not limited to the image forming apparatus, but arises in connection with various other apparatus, and particularly poses serious disadvantages on various processing apparatus which have a structure requiring heating.

SUMMARY OF THE INVENTION

It is a major object of the present invention to provide a calendar timer mechanism which is capable of effectively turning on and off an object to be controlled in an apparatus, depending on the manner in which the apparatus is used, and a processing apparatus incorporating such a calendar timer mechanism.

According to the present invention, there is provided a calendar timer mechanism having an OFF mode for turning off all objects to be controlled, an ON mode for turning on all the objects to be controlled, and at least two energy-saving modes for selectively turning off the objects to be controlled or turning on the objects to be controlled at a lower power consumption rate. Transitional times between at least three of the OFF mode, the ON mode, and the energy-saving modes can be set as desired.

Specifically, there is a trade off between the energy-saving ability and the startup time for each of the objects to be controlled. If a larger energy-saving ability is to be obtained, then a startup time is increased. If the system is not used for a long period of time, then a mode with a large energy-saving ability (and a long startup time) is selected. If the system is not used for a short period of time, then a mode with a short startup time (and a small energy-saving ability) is selected. Therefore, the calendar timer mechanism can make energy-saving abilities and startup times balanced as desired, providing an increased overall energy-saving capability.

The calendar timer mechanism is incorporated in a processing apparatus which has a structure requiring heating. Therefore, when the processing apparatus is shut off for a relatively short period of time, e.g., a break such as a lunchtime, objects to be controlled which do not need to be heated up are turned off, or objects to be controlled which need to be heated up are turned on at a lower power consumption rate. In this manner, it is possible to provide an energy-saving capability while keeping the startup time of the processing apparatus short for next processing operation. The processing apparatus can thus easily perform efficient and economical processing operation as a whole.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 3 is a diagram showing energy-saving modes carried out by the calendar timer mechanism;

FIG. 4 is a diagram showing the relationship between energy-saving abilities and startup times in energy-saving modes (1) through (3) and an OFF mode; and FIG. 5 is a diagram showing a format of settings that are made by the calendar timer mechanism in a hospital.

DESCRIPTION OF THE PREFERRED EMBODIMENT

Figure 1:
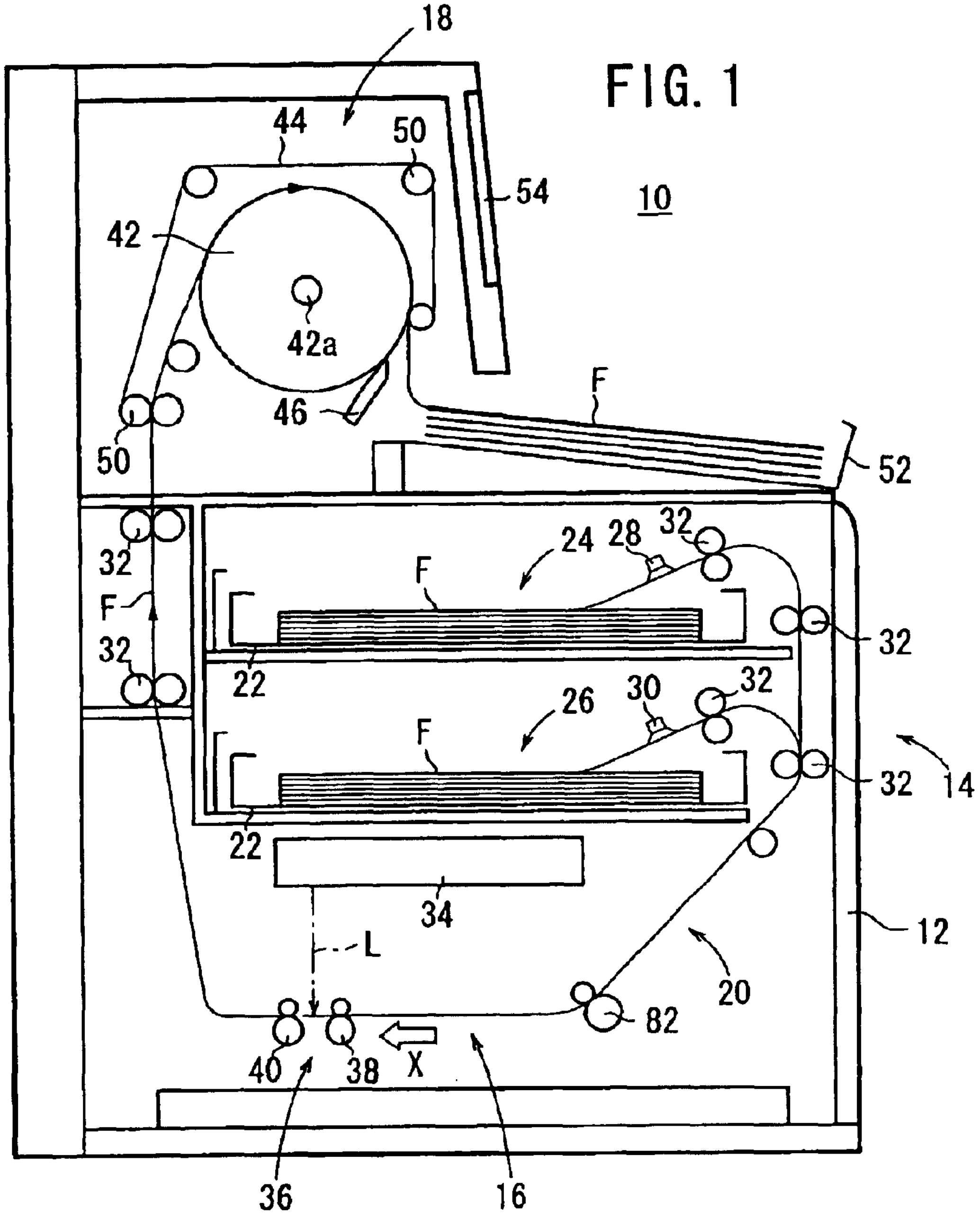
FIG. 1 is a vertical cross-sectional view showing an internal structure of an image forming apparatus which incorporates a calendar timer mechanism according to an embodiment of the present invention.

FIG. 1 shows in vertical cross section an internal structure of an image forming apparatus (processing apparatus) 10 which incorporates a calendar timer mechanism according to an embodiment of the present invention.

As shown in FIG. 1, the image forming apparatus 10 has a casing 12 housing therein a photosensitive medium supply 14, an image exposure assembly 16, and a thermal development unit 18, which are successively arranged in the direction in which a recording medium (photosensitive thermal-development recording medium) F is fed by a feed system 20. The photosensitive medium supply 14 has upper and lower loaders 24, 26 each supplied with a magazine 22 containing a predetermined number of stacked recording mediums F. The loaders 24, 26 are combined with sheet feeding means having respective suction cups 28, 30, and also respective pairs of feed rollers 32 of the feed system 20 at positions where leading ends of recording mediums F are picked up by the suction cups 28, 30.

The image exposure assembly 16 comprises an exposure unit 34 for applying a light beam L to a recording medium F while deflecting the light beam L in a main scanning direction (normal to the sheet of FIG. 1), and an auxiliary scanning feed means 36 for feeding the recording medium F in an auxiliary scanning direction (indicated by arrow X) which is substantially perpendicular to the main scanning direction. The exposure unit 34 comprises a known light beam scanning device, and the auxiliary scanning feed means 36 comprises a pair of feed roller pairs 38, 40.

The thermal development unit 18 comprises a heating drum 42, an endless belt 44, and a peel-off finger 46. The heating drum 42 houses therein a heating light source such as a halogen lamp or the like or a heat source such as a heater or the like. In the present embodiment, the heating drum 42 houses a heater 48 therein (see FIG. 2).

The heating drum 42 has its outer circumferential surface heated to and heat at a temperature depending on the thermal development temperature of the recording medium F. The heating drum 42 rotates about its central shaft **42*a* to move its outer circumferential surface in unison with the endless belt 44, thereby gripping and feeding the recording medium F. The endless belt 44 is trained around a plurality of rollers 50 and also around a certain angular range of the outer circumferential surface of the heating drum 42**.

A tray 52 for storing a stack of recording mediums F which have been thermally developed by the thermal development unit 18 is mounted on an upper shelf of the casing 12. The casing 12 supports a display panel 54 over the tray 52.

Figure 2:
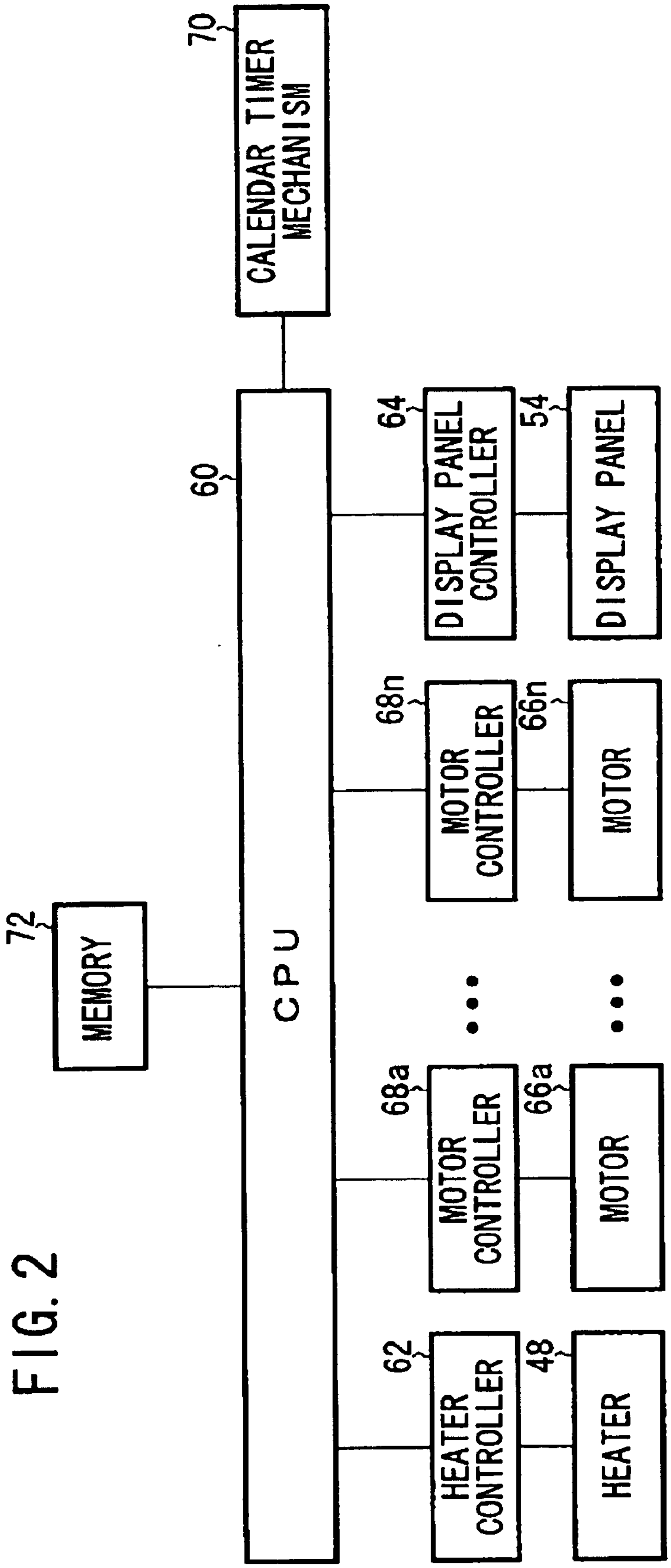
FIG. 2 is a block diagram of a control system for the image forming apparatus.

As shown in FIG. 2, a control system for the image forming apparatus 1 has a CPU (Central Processing Unit) 60 for controlling overall operation of the image forming apparatus 1. To the CPU 60, there are connected a heater controller 62 for controlling the heater 48, a display panel controller 64 for controlling the display panel 54, and a plurality of motor controllers **68*a* through 68*n* for controlling respective motors 66*a* through 66*n* of the sheet feeding means, the feed system 20, auxiliary scanning feed means 36**, etc.

The control system also has a calendar timer mechanism 70 for automatically controlling objects to be controlled, and a memory 72, the calendar timer mechanism 70 and the memory 72 being connected to the CPU 60. The memory 72 stores settings for turning on and off the objects to be controlled by the calendar timer mechanism 70.

Operation of the calendar timer mechanism 70 will be described below in connection with the image forming apparatus 10 which incorporates the calendar timer mechanism 70 therein.

It is possible with the calendar timer mechanism 70 to set various modes including an OFF mode for turning off all the objects to be controlled (including the heater 48, the display panel 54, and the motors **66*a* through 66*n*) of the image forming apparatus 10 for thereby shutting off the image forming apparatus 10 over a long period of time, an ON mode for turning on all the objects to be controlled, i.e., for operating all the objects normally, and a plurality of energy-saving modes (1) through (6)** described below.

As shown in FIG. 3, in the energy-saving mode (1), the display panel 54 is turned off, and the motors **66*a* through 66*n* and the heater 48 are turned on. In the energy-saving mode (2), the display panel 54 and the motors 66*a* through 66*n* are turned off, and the heater 48** is turned on.

In the energy-saving mode (3), the display panel 54 and the motors **66*a* through 66*n* are turned off, and the heater 48 is turned on with a lowered target temperature, i.e., at a lower power consumption rate. In the energy-saving mode (4), the display panel 54, the motors 66*a* through 66*n*, and the heater 48** are turned off.

In the energy-saving mode (5), the display panel 54 is turned off, the motors **66*a* through 66*n* are turned on, and the heater 48 is turned on with a lowered target temperature. In the energy-saving mode (6), the display panel 54 and the heater 48 are turned off, and the motors 66*a* through 66*n*** are turned on.

In the present embodiment, the energy-saving modes (1) through (3), the OFF mode, and the normal ON mode are selected, and transitional times between these modes are set as desired by the user. FIG. 4 shows the relationship between energy-saving abilities and startup times in the energy-saving modes (1) through (3) and the OFF mode. As shown in FIG. 4, the energy-saving abilities progressively increase from D to A, and the startup times are progressively shorter from D to A.

In the energy-saving mode (1), only the display panel 54 is turned off and the energy-saving ability is lower than the energy-saving abilities in the other modes. When the display panel 54 is turned on in the energy-saving mode (1), the image forming apparatus 10 instantly starts up, and hence the startup time thereof is very short. In the OFF mode, all the display panel 54, the motors **66*a* through 66*n*, and the heater 48 are turned off. Though the energy-saving ability in the OFF mode is thus considerably high, the startup time of the image forming apparatus 10 is the longest as the heat-up of the heater 48** in particular is time-consuming.

For automatically operating the image forming apparatus 10 actually in a hospital using the energy-saving modes (1) through (3) and the OFF mode, a format shown in FIG. 5, for example, is drawn up. The format represents modes used to automatically operate the image forming apparatus 10 in a hospital over a week.

As shown in FIG. 5, the hospital is closed on Wednesday, Saturday, and Sunday, and takes a longer lunchtime on Friday. The hospital has its consultation hours beginning at 9:00, for example, and its lunchtime from 12:00 to 1:00 on Monday, Tuesday, and Thursday, and from 12:00 to 2:00 on Friday, for example.

On Wednesday, Saturday, and Sunday when the hospital is closed, the image forming apparatus 10 is set to the OFF mode whose energy-saving ability is maximum. In the morning of Thursday and Monday following the days taken off, the image forming apparatus 10 automatically changes from the OFF mode to the ON mode. When the shorter lunchtime begins on Monday, Tuesday, and Thursday, the image forming apparatus 10 changes from the ON mode to the energy-saving mode (1) whose startup time is shortest. When the shorter lunchtime ends, the image forming apparatus 10 goes back to ON mode. When the longer lunchtime begins on Friday, the image forming apparatus 10 changes from the ON mode to the energy-saving mode (2) whose energy-saving ability is higher than the energy-saving ability in the energy-saving mode (1).

In the nights of Monday and Thursday, the image forming apparatus 10 changes from the ON mode to the energy-saving mode (3) whose startup time is shorter than the startup time of the OFF mode and whose energy-saving ability is relatively high, so that the image forming apparatus 10 can be started up efficiently in the next morning. In the nights of Tuesday and Friday preceding the days to be taken off, the image forming apparatus 10 changes from the ON mode to the OFF mode which provides the maximum energy-saving ability.

In the present embodiment, as described above, there are available, in addition to the OFF mode for turning off all the objects to be controlled and the ON mode for turning on all the objects to be controlled, at least two energy-saving modes, e.g., three energy-saving modes (1) through (3), for selectively turning off desired objects to be controlled or turning on desired objects to be controlled at a lower power consumption rate. In view of the manner in which the image forming apparatus 10 is used in a hospital, i.e., in view of days when the hospital is closed and lunchtime settings, the energy-saving modes (1) through (3) are set up as desired based on the relationship between the energy-saving abilities and the startup times.

Specifically, there is a trade off between the energy-saving ability and the startup time (see FIG. 4). For example, when the OFF mode having the maximum energy-saving ability is set, the startup time is considerably increased. Therefore, on Wednesday, Saturday, and Sunday when the preset the image forming apparatus 10 is not used for a long period of time, the image forming apparatus 10 is set to the OFF mode having the maximum energy-saving ability all day long. In lunchtimes when the image forming apparatus 10 is not used for a short period of time, the image forming apparatus 10 is set to the energy-saving mode (1) or (2) which has the relatively low energy-saving ability but the short startup time.

The calendar timer mechanism 70 thus allows much more finely adjusted energy-saving measures to be taken than conventional calendar timer devices which only selectively turns on and off the power supply, thus providing a large energy-saving ability as a whole. When the image forming apparatus 10 is automatically controlled by the calendar timer mechanism 70, therefore, the image forming apparatus 10 can easily perform a thermal development process efficiently and economically.

If there is a possibility to use the image forming apparatus 10 at night, then the image forming apparatus 10 may not change from the ON mode directly to the energy-saving mode (3) in the night of Monday, for example, but may be set to the energy-saving mode (1) and/or energy-saving mode (2) between the ON mode and the energy-saving mode (3) to make itself available quickly for sudden use.

The current mode that the image forming apparatus 10 is set to by the calendar timer mechanism 70 can be displayed on the display panel 54, for example. It is preferable for the display panel 54 to energize LEDs continuously or intermittently or in different colors to permit the user to easily visually recognize which mode the image forming apparatus 10 is set to.

When the image forming apparatus 10 changes to the ON mode, it carries out a process of forming images on recording mediums F. Specifically, the CPU 60 sends drive signals to the motor controllers **68*a* through 68*n* to control the motors 66*a* through 66*n*. The recording mediums F loaded in the photosensitive medium supply 14 are taken one by one from the loader 24 or 26 by the suction cup 28 or 30, and then delivered to the image exposure assembly 16 by the feed system 20**.

When a recording medium F reaches the image exposure assembly 16, the exposure unit 34 emits a light beam L which has been modulated by desired image data to be recorded. The light beam L is applied to the recording medium F while being deflected in the main scanning direction along the recording medium F. At the same time, the recording medium F is gripped and fed in the direction indicated by the arrow X upon rotation of the roller pairs 38, 40 of the auxiliary scanning feed means 36. Consequently, the recording medium F is two-dimensionally exposed to and scanned by the light beam L to record a latent image thereon based on the image data by which the light beam L is modulated.

The recording medium F with the latent image recorded thereon by the image exposure assembly 16 is then fed to the thermal development unit 18 by the feed system 20. In the thermal development unit 18, the recording medium F is inserted between the heating drum 42 which has been heated to a predetermined temperature by the heater 48 and the endless belt 44. As the recording medium F which is gripped between the heating drum 42 and the endless belt 44 is fed along the outer circumferential surface of the heating drum 42, the latent image recorded on the recording medium F is thermally developed into a visible image. The recording medium F which carries the visible image is then peeled off the heating drum 42 by the peel-off finger 46, and thereafter placed in the tray 52.

In the present embodiment, the calendar timer mechanism 70 is incorporated in the image forming apparatus 10. However, the calendar timer mechanism 70 is not limited to use in the image forming apparatus 10, but may be incorporated in any of various processing apparatus. Particularly, if the calendar timer mechanism 70 is incorporated in processing apparatus which has a structure requiring heating, then the calendar timer mechanism 70 can make energy-saving abilities and startup times balanced as desired in the processing apparatus for economical and efficient processing operation.

The calendar timer mechanism according to the present invention has, in addition to the modes for turning on and off all the objects to be controlled, at least two energy-saving modes for selectively turning off desired objects to be controlled or turning on desired objects to be controlled at a lower power consumption rate. With these energy-saving modes available, the calendar timer mechanism can make energy-saving abilities and startup times balanced as desired.

The calendar timer mechanism is incorporated in a processing apparatus which has a structure requiring heating. Therefore, when the processing apparatus is shut off for a relatively short period of time, e.g., a break such as a lunchtime, objects to be controlled which do not need to be heated up are turned off, or objects to be controlled which need to be heated up are turned on at a lower power consumption rate. In this manner, it is possible to provide an energy-saving capability while keeping the startup time of the processing apparatus short for next processing operation. The processing apparatus can thus easily perform efficient and economical processing operation as a whole.

Although a certain preferred embodiment of the present invention has been shown and described in detail, it should be understood that various changes and modifications may be made therein without departing from the scope of the appended claims.

What is claimed is:

1. A calendar timer mechanism having:

an OFF mode for turning off all objects to be controlled;

an ON mode for turning on all the objects to be controlled; and at least two energy-saving modes for selectively turning off the objects to be controlled or turning on the objects to be controlled at a lower power consumption rate;

wherein transitional times between at least three of the OFF mode, the ON mode, and the energy-saving modes can be set as desired.

2. A calendar timer mechanism according to claim 1, wherein said objects to be controlled include at least a beat source or a drive source.

3. A calendar timer mechanism according to claim 1, wherein said energy-saving modes are selected based on the relationship between an energy-saving ability and a startup time for the objects to be controlled.

4. A calendar timer mechanism according to claim 3, wherein a startup time is increased if a larger energy saving ability is obtained and wherein a startup time is shortened if a smaller energy saving ability is obtained.

5. A calendar timer mechanism according to claim 1, wherein said objects to be controlled include at least a heat source housed inside of a heating drum and wherein said heating drum comprises an outer circumferential surface to be heated.

6. A calendar timing mechanism of claim 1 wherein all the objects to be controlled include multiple objects and selectively turning off objects comprises independent operation of each of the multiple objects.

7. The calendar timing mechanism according to claim 1, wherein the lower power consumption rate comprises a lower rate relative to the ON mode for the object to be controlled.

8. A processing apparatus comprising a structure requiring heating and incorporating a calendar timer mechanism for automatically controlling the processing apparatus, said calendar timer mechanism having:

an OFF mode for turning off all objects to be controlled;

an ON mode for turning on all the objects to be controlled; and at least two energy-saving modes for selectively turning off the objects to be controlled or turning on the objects to be controlled at a lower power consumption rate;

wherein transitional times between at least three of the OFF mode, the ON mode, and the energy-saving modes can be set as desired.

9. A processing apparatus according to claim 8, wherein said objects to be controlled include at least a heat source or a drive source.

10. A processing apparatus according to claim 8, wherein said energy-saving modes are selected based on the relationship between an energy-saving ability and a startup time for the objects to be controlled.

11. A processing apparatus according to claim 8, having a memory for storing settings about the ON and OFF modes of said calendar timer mechanism for turning on and off the objects to be controlled.

12. A processing apparatus of claim 8 wherein all the objects to be controlled include multiple objects and selectively turning off objects comprises independent operation of each of the multiple objects.

13. The processing apparatus of claim 8, wherein the lower power consumption rate comprises a lower rate relative to the ON mode for the object to be controlled.

* * * * *